United States Patent [19]

Takayama et al.

[11] Patent Number: 4,632,208
[45] Date of Patent: Dec. 30, 1986

[54] VEHICLE BRAKING SYSTEM

[75] Inventors: Toshio Takayama, Kanagawa; Hiromi Ando, Tokyo; Yukio Matsumoto, Kanagawa, all of Japan

[73] Assignee: Tokico Ltd., Kawasaki, Japan

[21] Appl. No.: 683,196

[22] Filed: Dec. 18, 1984

[30] Foreign Application Priority Data

Dec. 20, 1983 [JP] Japan ............................ 58-195547[U]
Dec. 20, 1983 [JP] Japan ............................ 58-195550[U]

[51] Int. Cl.$^4$ ............................................... B60T 7/12
[52] U.S. Cl. ..................................... 180/271; 188/355; 303/3; 303/100
[58] Field of Search ...................... 303/7, 9, 18, 53, 76, 303/79, 50, 56, 3, 100; 188/170, 106 R, 355, 356, 357, 358, 359; 180/271, 282

[56] References Cited

U.S. PATENT DOCUMENTS

| 2,313,232 | 3/1943 | Freeman | 192/3 R |
|---|---|---|---|
| 3,357,311 | 12/1967 | Cripe | 91/32 |
| 3,364,818 | 1/1968 | Hager et al. | 91/24 |
| 3,528,707 | 9/1970 | Casey | 180/271 |
| 3,831,698 | 8/1974 | Fontaine | 180/271 |
| 3,843,206 | 10/1974 | Teagle | 180/271 |

FOREIGN PATENT DOCUMENTS 52-41838 10/1977 Japan .
58-60563 4/1983 Japan .

Primary Examiner—Richard A. Bertsch
Attorney, Agent, or Firm—Wenderoth, Lind & Ponack

[57] ABSTRACT

A vehicle braking system for use in a vehicle such as an automobile, and including at least one wheel brake, a brake pedal, and a brake applying device such as a master cylinder or a pneumatic booster which is connected to the brake pedal for applying hydraulic pressure on the wheel brake in response to actuation of the brake pedal. A selector valve is connected to the brake applying device and acts, when actuated, to maintain hydraulic pressure in the wheel brake irrespective to the release of the brake pedal. Further, there are provided at least one sensor such as a sensor sensing the running speed of the vehicle, a sensor sensing the actuation of a gas pedal, a sensor sensing whether a seat belt in the driver's seat is fitted on or not and the like, and a controller connected to the sensor for actuating the selector valve in response to a predetermined operational condition of the vehicle.

9 Claims, 5 Drawing Figures

VEHICLE BRAKING SYSTEM

BACKGROUND OF THE INVENTION

This invention relates to a vehicle braking system for use in a vehicle such as an automobile.

In driving a vehicle, such as an automobile, it is sometimes desired to maintain braking force even though after a brake pedal is released, particularly, in stopping the vehicle on a sloped road or in frequent of stopping the vehicle due to a traffic jam. As such, there has been proposed some vehicle braking systems for automatically generating or maintaining the braking force in response to a predetermined condition. One example of prior art braking systems comprises a selector valve provided in a pipe line between a wheel brake and a master cylinder of the braking system for selectively permitting or intercepting the communication through the pipe line. By depressing a brake pedal hydraulic pressure is supplied to the wheel brake and, the selector valve is actuated by a predetermined operation such as the release of a depression force on the brake pedal, whereby the hydraulic pressure is maintained in the wheel brake even though the depression force on the brake pedal is released. Another example comprises a pneumatic booster interposed between the brake pedal and a master cylinder. The booster comprises a shell housing, a power piston displaceably mounted in the shell housing and partitioning the interior of the shell housing through a flexible diaphragm into a front vacuum chamber and a rear pressure chamber, and an output shaft connected to the power piston to actuate a piston of the master cylinder. Normally, atmospheric pressure is introduced into the pressure chamber by depressing a brake pedal and, the pressure introduced into the pressure chamber is exhausted to the vacuum chamber when the depression force on the brake pedal is released. At a predetermined operational condition the pressure in the pressure chamber is maintained even though the depression force on the brake pedal is released, whereby the wheel brake can be maintained at the braked condition.

Japanese Patent Publication No. 41838/1977 shows a pneumatic servo booster interposed between a brake pedal and a master cylinder of a hydraulic braking system of a vehicle, and an electromagnetic device connecting the brake pedal and an input rod of the booster. At a desired operating condition of the vehicle, the electromagnetic device acts to lock the input rod at an actuated condition automatically. The electromagnetic device requires a relatively large of electric power and the construction is complicated.

Japanese Utility Model Disclosure No. 60563/1983 shows a vehicle braking system comprising an electromagnetic device for electromagnetically locking a brake pedal at the braked position, a brake locking circuit for supplying a brake locking signal to the electromagnetic device at a predetermined condition, a seat sensor for generating a signal when the driver of the vehicle is not setting on a seat, an alarm for generating an alarm signal in receiving the brake locking signal and the seat signal, and a release circuit for releasing the brake locking circuit and the alarm in response to the actuation of a parking brake. The document does not show an embodiment of the electromagnetic device for locking the brake pedal, but, it is considered that the construction is complicated and the power consumption is relatively large.

SUMMARY OF THE INVENTION

The present invention aims at solving the aforesaid problems in the prior art devices and, according to the invention, there is provided a vehicle braking system for use in a vehicle such as an automobile, and including at least one wheel brake, a brake pedal, and a brake applying device connected to the brake pedal for applying hydraulic pressure on the wheel brake in response to actuation of the brake pedal; wherein a selector valve is provided in the brake applying device and acts, when actuated, to maintain hydraulic pressure in the wheel brake irrespective of the release of the brake pedal, and there is provided at least one sensor such as a sensor sensing the running speed of the vehicle, a sensor sensing the actuation of a gas pedal, a sensor sensing whether a seat belt in the driver's seat is attached on or not and the like, and a controller connected to a sensor for actuating the selector valve in response to a predetermined operational condition of the vehicle.

The brake applying device may be a hydraulic device such as a master cylinder wherein the selector valve is a hydraulic valve for cutting off the connection between the master cylinder and one or more wheel brakes. Alternatively, the brake applying means may be a pneumatic booster, and the selector valve acts to maintain a pneumatic pressure in the booster.

BRIEF DESCRIPTION OF THE DRAWINGS

Further objects and effects of the invention will become apparent from the following detailed description taken with reference to the accompanying drawings exemplifying some preferred embodiments of the invention, in which.

DETAILED DESCRIPTION OF THE PREFERRED EMBODIMENTS

Figure 1:
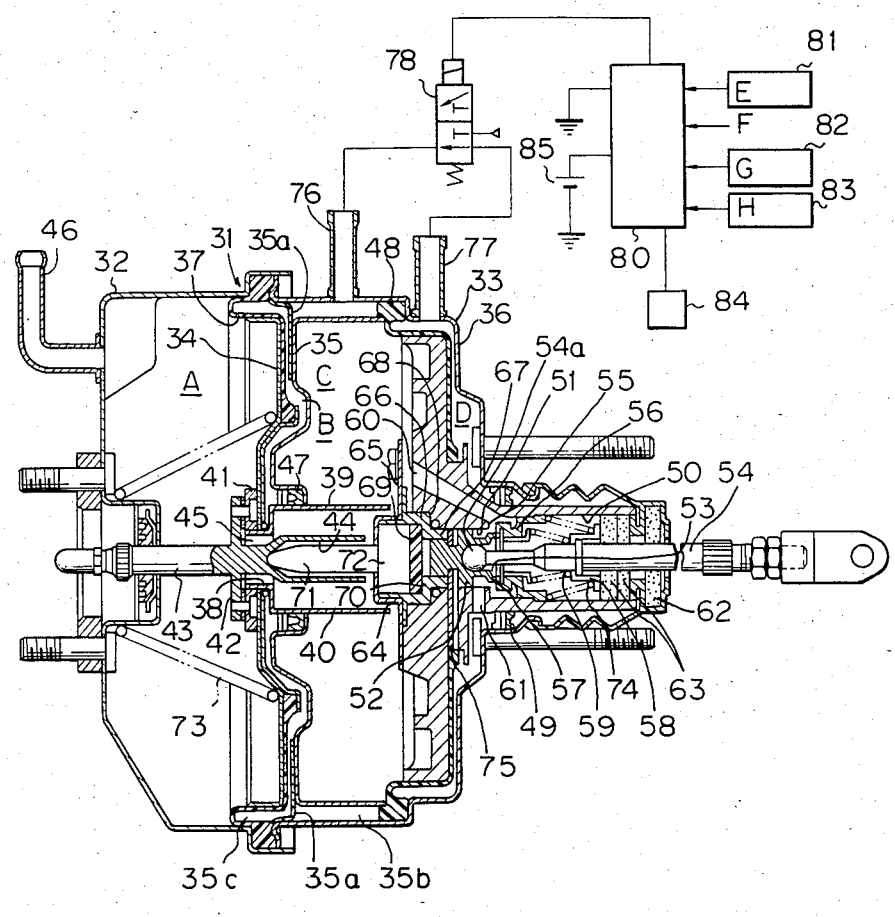
FIG. 1 is a longitudinal sectional view of a tandem type booster and a schematic diagram of a related pipe line and an electric circuit according to a first embodiment of the invention.

FIG. 1 shows a first embodiment of the invention, wherein shown at 31 is a main body of a tandem booster and consists of a front shell 32 and a rear shell 33. The main body 31 receives therein a front power piston 34, a partition wall 35 and a rear power piston 36 which partition the interior of the main boby 31 into a vacuum chamber A, a pressure chamber B, a vacuum chamber C and a pressure chamber D.

The front power piston 34 is axially displaceably connected to the inner circumference of the main body 31 through a flexible diaphragm 37. A tubular member 40 having a small diameter portion 38 and a large diameter portion 39 is secured to the front power piston 34, with the small diameter portion 38 passing through the central portion of the power piston 34 and screwthreadingly engaging with a nut 41. An output shaft 43 having a flange portion 42 is fitted in the tubular member 40 with the flange portion 42 being secured to the nut 41. The front end (left end as viewed in FIG. 1) of the output shaft 43 extends sealingly through the front shell 32 to the outside of the main body 31 and is adapted to be connected to a device such as a piston of a master cylinder (not shown in FIG. 1). An axially extending recess 44 is formed in the rear end of the output shaft 43. The large diameter portion 39 of the tubular member 40 sealingly and slidably engages with the central portion of the partition wall 35 through a seal 47. A passage 45 is formed between the output shaft 43 and the inner circumference of the small diameter portion 38 for permanently communicating the chambers A and C.

The outer circumferential portion of the partition wall 35 is bifurcated into a rearwardly extending annular portion and a radially extending portion and is fixedly retained on the rear shell 33. The radially extending portion of the partition wall 35 has communicating holes 35a (only one of which is shown in FIG. 1), and the rearwardly extending portion of the partition wall 35 defines an annular chamber 35b between the rearwardly extending position of the partition wall 35 and the inner circumference of the rear shell 33. The front surface of the partition wall 35 defines a chamber 35c between the front surface of the partition wall 35 and the rear surfaces of the diaphragm 37 and the power piston 34. The pressure chamber B consists of the chamber 35c and the chamber 35b.

The rear power piston 36 is mounted on the rear shell 33 and the partition wall 35 through a flexible diaphragm 48 and, is mounted slidably and sealingly on the central bore of the rear shell 33 through a seal 49. The rear end portion of the power piston 36 extends rearwards from the rear shell 33. The rear end portion of the power piston 36 has a stepped central bore 50 therein. A plunger 52 is slidably fitted in a cylinder portion 51 constituting a portion of the bore 50. A recess 53 is formed in the rear end of the plunger 52 for receiving therein a ball end 54a of a push rod 54. The rear end of the push rod 54 is adapted to be connected to a brake pedal of an automobile or the like (not shown in the drawing). The plunger 52 and the push rod 54 constitute an input shaft. Annular valve seats 55 and 57 are formed respectively on the rear ends of the cylinder portion 51 and the plunger 52 to cooperate with a poppet valve 56 which is provided in the bore 50. The poppet valve 56 is biased toward the valve seats 55 and 57 by a spring 59 which is disposed between the poppet valve 56 and a spring retainer 58 being mounted on the push rod 54. In normal non-actuated condition of the booster, the poppet valve 56 engages with the valve seat 57 and is spaced from the valve seat 55 as shown in FIG. 1.

A passage 60 is formed in the rear power piston 36 with the front end thereof opening to the vacuum chamber C and the rear end thereof opening to the bore 50 at a location rearwards of the valve seat 55 and forward of the rear end of the poppet valve 56, through which rear end the poppet valve is connected to the bore 50. Further, a radial passage 61 is formed in the power piston 36 with the radially outer end thereof opening to the chamber D and the other end opening to the bore 50 at the location forwards of the valve seat 55. Thus, in the non-actuated condition, the chambers C and D are communicated through the passages 60 and 61, and the chambers C and D are separated from the atmosphere. It will be understood that the interior of the bore 50 is communicated with the atmosphere through an opening formed in the rear end of the power piston 36, a silencer 62 and an air cleaner 63.

An increased diameter portion or a counterbore 64 is formed in the forward end of the bore 50, and a tubular member 68 having a flange portion 65, a large diameter portion 66 and a small diameter portion 67 is fitted in the counterbore 64 and the forward end of the cylinder portion 51 with the large diameter portion 66 being snugly fitted in the counterbore 64. The flange portion 65 of the tubular member 68 is secured to the front surface of the rear power piston 36. A reaction disc 69 formed of a resiliently deformable material such as rubber is retained in the large diameter portion 66 and abuts with a shoulder 70 which is defined between the inner surfaces of the large diameter portion 66 and the small diameter portion 67.

Shown at 71 is an intermediate rod having a flange portion 72 which is slidably received in the inner surface of the large diameter portion 66 of the tubular member 68. The forward end of the intermediate rod 71 is received in the recess 44 in the output shaft 43 and normally abuts with the bottom of the recess 44.

A return spring 73 acts between the front shell 32 and the front power piston 34 to bias rearwards the front and rear power pistons 34 and 36.

The push rod 54 is biased rearwards by a spring 74 which is disposed between the spring retainer 58 and the rear end of the poppet valve 56. Further, a stop 75 is provided to restrict the rearward movement of the plunger 52.

Connecting tubes 76 and 77 are provided on the rear shell 33 to communicate respectively with chambers B and D. The connecting tubes 76 and 77 are connected through a selector valve 78. The selector valve 78 takes a first position wherein the chambers B and D are communicated with each other and a second position wherein the chambers B and D are isolated and the chamber B is communicated with the atmosphere through the valve 78. A controller 80 is electrically connected to the selector valve 78. The controller 80 receives a vehicle speed signal E from a sensor 81 mounted on a suitable portion of the vehicle for detecting the running speed of the vehicle, a gas pedal operating signal F from a suitable sensor (not shown) for generating the signal when the gas pedal is in the operating condition, a seat belt fitting signal G from a seat belt fitting sensor 82 for generating the signal when the driver of the vehicle has attached a seat belt, and a steering touch signal H from a steering touch sensor 83. The controller 80 acts to switch the selector valve 78 when these signals satisfy a predetermined condition. Normally, the selector valve 78 takes the first condition and the chambers B and D are communicated with each other. Further, a warning device 84 and an indicator (not shown) are connected to the controller 80 for indicating the condition of respective signals and generating an alarm signal at a predetermined condition such that the seat belt fitting signal is not received with the gas pedal operating signal or the steering touch signal being received. An electric source 85 is connected to the controller 80.

The operation of the device shown in FIG. 1 will now be explained. In the normal non-actuated condition, the chambers B and D are communicated through connecting tubes 76 and 77 and the selector valve 78. When the brake pedal is depressed the push rod 54 and the plunger 52 together with the poppet valve 56 (the front end portion thereof) displace forwards relative to the rear power piston 36 which is maintained standstill at that condition. The poppet valve 56 engages with the valve seat 55 thereby intercepting the communication between the chambers C and D. When the push rod 54 is further displaced the valve seat 57 on the plunger 52 separates from the poppet valve 56. The atmospheric air in the bore 50 is introduced into the chamber D through a central opening in the poppet valve 56, the space between the poppet valve 56 and the valve seat 57, and the radial passage 61. Further, the atmospheric air introduced into the chamber D flows into the chamber B through the connecting tube 77, the selector valve 78 and the connecting tube 76. While the chambers A and C are permanently communicated with a source of vacuum pressure such as an intake manifold of an engine of the vehicle through the connecting tube 46. Accordingly, a pressure difference generates between the chambers B and A and, also, a pressure difference generates between the chambers D and C. The front power piston 34 and the rear power piston 36 are respectively pushed forwards thereby generating a boosting function. The thrust on the front power piston 34 is directly transmitted to the output shaft 43, while, the thrust on the rear power piston 36 is transmitted to the output shaft 43 through the reaction disc 69 and the intermediate rod 71.

Incidentally, a reaction force is transmitted through the reaction disc 69 from the intermediate rod 71 to the plunger 52 with the reaction disc 69 being resiliently deformed. The reaction force is transmitted to the brake pedal through the plunger 52 and the push rod 54.

Due to the forward displacement of the rear power piston 36, the valve seat 57 may engage with the poppet valve 56 to disconnect the communication between the atmosphere and the chambers B and D whereby the booster takes an equilibrium condition, but when the brake pedal is depressed further, the booster acts similarly and a further increased force is transmitted from the output shaft 43.

When the depressing force on the brake pedal is released the plunger 52 and the push rod 54 together with the poppet valve 56 displace rearwards. The valve seat 55 separates from the poppet valve 56, thus, the air in the chamber D is communicated with the chamber C through the passage 61, the interior of the cylinder portion 51, the space between the valve seat 55 and the poppet valve 56, and the passage 60. The chamber B is communicated with the chamber D through connecting pipes 76 and 77 and the selector valve 78, and the chamber C is communicated through the passage 45 with the chamber A which is permanently communicated with the source of vacuum pressure. Thus, chambers A, B, C and D are maintained at the same vacuum pressure, and the booster returns to the condition of FIG. 1.

In the embodiment, the controller 80 acts to change the selector valve 78 when the vehicle speed signal E from the sensor 81 is lower than a predetermined speed, the gas pedal operating signal F is in the non-operating condition, the seat belt fitting signal G shows that the seat belt is in the fitted condition, and the steering touch signal H shows that the driver of the vehicle is touching the steering wheel, then, the atmospheric air is introduced into the chamber B through the selector valve 78 and the connecting tube 76, whereby the front power piston 34 is moved forward and a braking force is generated automatically. Such automatic actuation of brakes is advantageous when the driver of the vehicle wishes to apply brakes on a sloped road, or to apply brakes frequently in a traffic jam.

In such an automatic brake actuating condition, when the driver of the vehicle takes off the seat belt or releases his hand from the steering wheel, the warning device 84 generates a warning signal and the selector valve 78 returns to the original position as shown in FIG. 1 after a predetermined time period. Thus, the driver of the vehicle is required to apply a hand brake prior to the predetermined time period or prior to the aforesaid actions. Incidentally, it is preferable to provide a hand brake actuating sensor connected to the controller 80 such that the selector valve 78 does not return to the initial position unless the hand brake has been actuated.

Further, the seat belt fitting sensor 82 and/or the steering touch sensor 83 may be omitted such that the braking force automatically generates even though the driver of the vehicle is not touching the steering wheel and/or the seat belt is not fitted.

Figure 5:
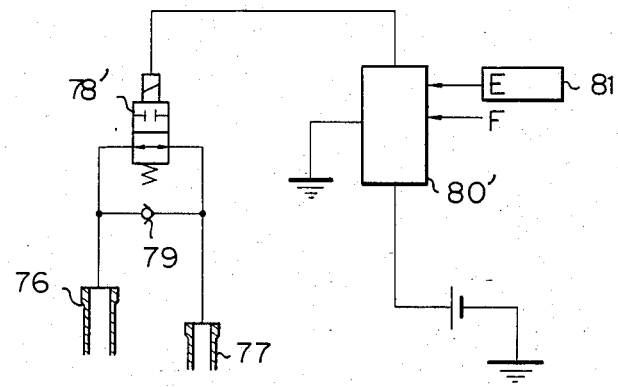
FIG. 5 is a partial view showing a modified form of the first embodiment of the invention.

FIG. 5 shows a modified form wherein the connecting tubes 76 and 77 are connected through a selector valve 78' and a check valve 79 which permits the air flow from the connecting tube 77 (the chamber D) to the connecting tube 76 (the chamber B) and prevents the air flow in the opposite direction. The selector valve 78' has a first normal position for communicating freely the chambers B and D and a second position for intercepting the communication therebetween. The controller 80' for actuating the selector valve 78' receives the vehicle speed signal E and the gas pedal operating signal F, but, the seat belt fitting signal G and the steering touch signal H in the first embodiment are omitted.

The operation of the embodiment of FIG. 5 is generally similar to the first embodiment, but, in the embodiment, the controller 80' changes the selector valve 78' when the vehicle speed signal E shows the speed of the vehicle is zero and the gas pedal is at non-actuated condition into the second condition wherein the air flow from the chamber B to the chamber D is intercepted. The front power piston 34 is maintained at the actuated condition, while, the rear power piston 36 may return to the non-actuated condition in response to the release in the depressing force on the brake pedal. Thus, some amount of braking force is automatically maintained on brakes. It is possible to increase further the remaining braking force by depressing the brake pedal to introduce further the atmospheric air into the chamber B since the check valve 79 permits the air flow from the chamber D to the chamber B. When it is desired to release the remaining braking force the gas pedal is depressed by a small amount. The selector valve 78' returns to its original position, and the chamber B is communicated through chambers D, C and A with the source of vacuum pressure. In a further modified form, a sensor detecting the operation of the hand brake is connected to the controller 80' to reset the selector valve 78'.

Figure 2:
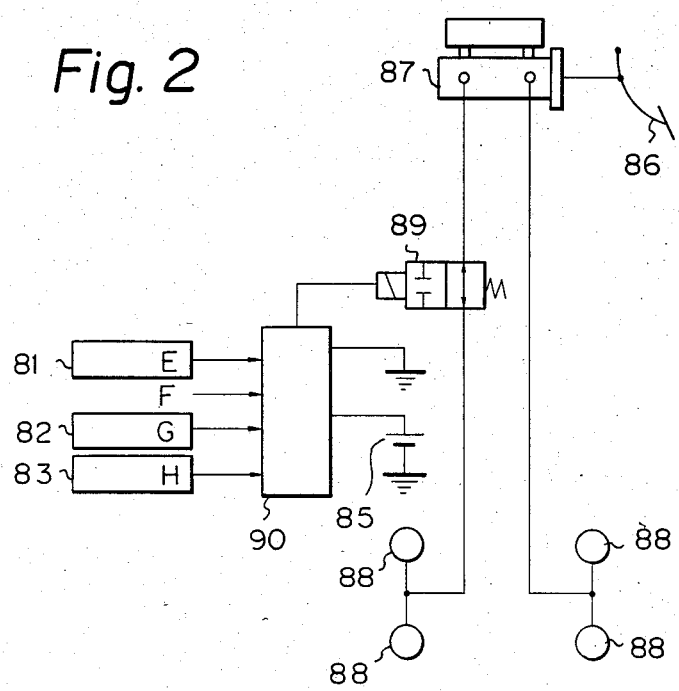
FIG. 2 is a schematic diagram of hydraulic and electric circuit according to a second embodiment of the invention.

FIG. 2 shows a vehicle braking system according to a second embodiment of the invention. A tandem type master cylinder 87 is actuated by a brake pedal 86 and supplies pressurized liquid to wheel brakes 88. A selector valve 89 is interposed in a line connecting the master cylinder 87 and wheel brakes 88 to selectively permit or intercept the communication therebetween. The selector valve 89 is controlled by a controller 90 which is generally similar to the controller 80 in the embodiment of FIG. 1.

The operation of the embodiment of FIG. 2 is generally similar to the embodiment of FIG. 1 and, therefore, the description is omitted.

Figure 3:
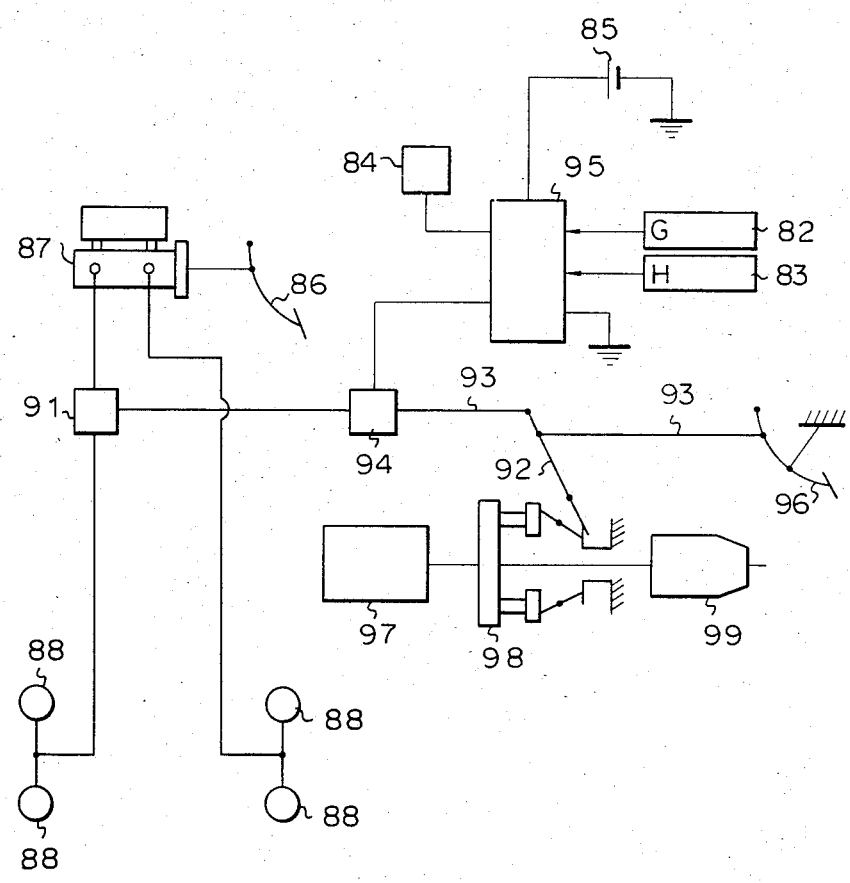
FIG. 3 is a view similar to FIG. 2 but showing a third embodiment of the invention.

FIG. 3 shows a third embodiment of the invention, which is modified from the second embodiment. The hydraulic braking system is generally similar to the embodiment of FIG. 2 and the same reference numerals are applied to corresponding parts. A selector valve 91 interposed in one of the pressure lines connecting the master cylinder 87 and wheel brakes 88 is generally similar to the selector valve 89 in FIG. 2, but, the selector valve 91 is connected mechanically to a clutch pedal 96 through a connecting wire 93, and an electromagnetic connector 94 is interposed in the connecting wire 93 so as to electrically control the connection between the clutch pedal 96 and the selector valve 91. The electromagnetic connector 94 is controlled by a controller 95 which receives seat belt fitting signal G and steering touch signal H similar to the first and second embodiments. Shown at 92 in FIG. 3 is a clutch actuating lever, at 97 is an engine, at 98 is a clutch device and at 99 is a transmission device.

In the embodiment, the electromagnetic connector 94 takes a connecting position when the seat belt fitting signal G and the steering touch signal H are received by the controller 95, whereby, when the brake pedal 86 is actuated and the clutch pedal 96 is depressed, the selector valve 91 takes an intercepting position and a braking force can be maintained on wheel brakes 88 even though the depressing force on the brake pedal 86 is released. However, when the seat belt is not fitted or the driver does not touch the steering wheel the connector 94 intercepts the connection between the selector valve 91 and the clutch pedal 96 and, it is not possible to retain automatically the braking force.

Figure 4:
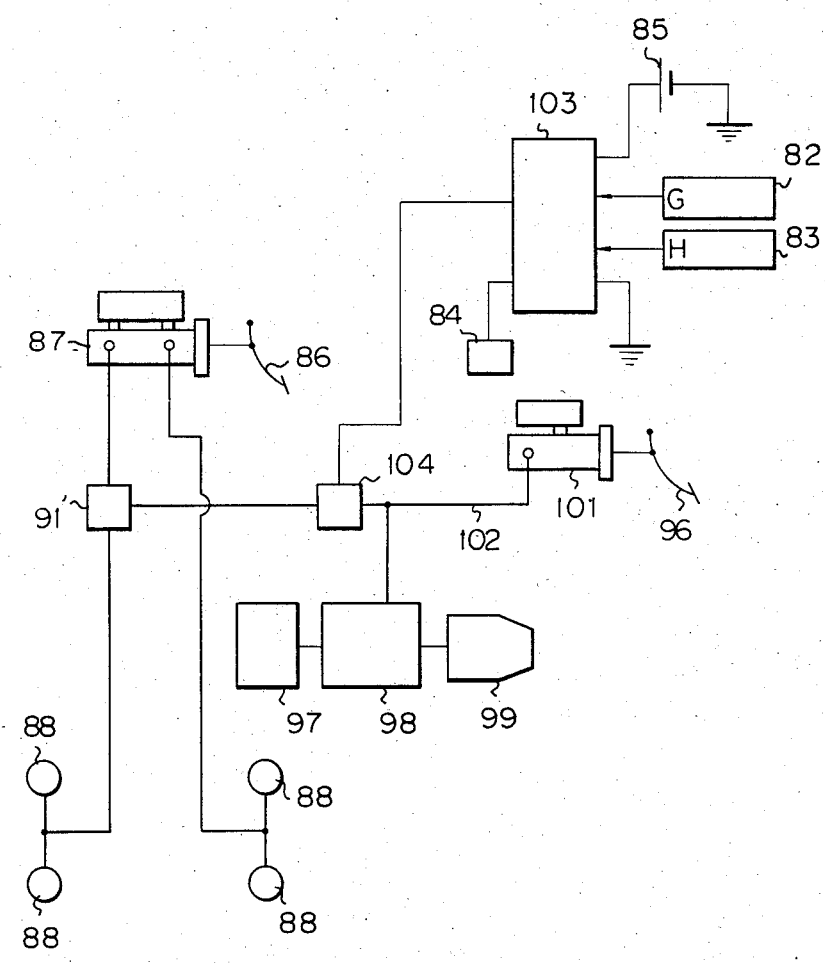
FIG. 4 is a view similar to FIG. 3 but showing a modified form.

FIG. 4 shows a modified form of the third embodiment, wherein the electromagnetic connector 94 in FIG. 3 is replaced by an electromagnetic valve 104. The valve 104 takes an open position when a controller 103 similar to the controller 95 in FIG. 3 receives both signals G and H. Further, the clutch pedal is connected to a clutch master cylinder 101 which supplies pressurized liquid through a pipe line 102 to the clutch device 98. The pipe line 102 is also connected to a selector valve 91' through the valve 104. Thus, when the signals G and H are received by the controller 103 and the clutch pedal 96 is actuated, pressurized liquid from the clutch master cylinder 101 flows through the valve 104 to the selector valve 91'. The selector valve 91' acts to maintain the pressure in wheel brakes 88.

As described heretofore, according to the invention it is possible to automatically maintain at least one of wheel brakes in a braked condition irrespective of the release of the brake pedal and at a predetermined operational condition of the vehicle, thus, driving safety is improved and the driving operation can be simplified.

It will be understood that the invention is not limited to the embodiments described herein and that various chahges or modifications may easily be applied within the scope of the invention.

What is claimed is:

1. A vehicle braking system comprising:

at least one wheel brake;

a master cylinder for generating hydraulic pressure;

a pipe line connecting said master cylinder to said at least one wheel brake;

a tandem type pneumatic booster including a hollow main body, a front flexible diaphragm disposed in said main body, a front power piston secured to said front flexible diaphragm and forming a front vacuum chamber and a front pressure chamber, an output shaft connected to said front power piston and adapted to actuate said master cylinder, a partition wall in said main body separating said front pressure chamber from a rear vacuum chamber, means for maintaining fluid communication between said front vacuum chamber and said rear vacuum chamber, a rear diaphragm disposed in said main body, a rear power piston secured to said rear diaphragm and separating said rear vacuum chamber from a rear pressure chamber, means attached to said rear power piston for selectively communicating said rear pressure chamber with said rear vacuum chamber and a source of air at atmospheric pressure, and an input rod connected to said rear power piston; and selector valve means for intercepting communication between said front pressure chamber and said rear pressure chamber, said selector valve means including tubing connected between said front pressure chamber and said rear pressure chamber, a selector valve disposed in said tubing, at least one sensor selected from the group consisting of a vehicle speed sensor, a gas pedal sensor, a seat belt attachment sensor and a steering wheel touch sensor, said at least one sensor for sensing an operating condition of a vehicle and a controller, connected to said selector valve and said at least one sensor, for actuating said selector valve in response to a predetermined operating condition of the vehicle, said selector valve when in the non-actuated condition permitting air flow between said front pressure chamber and said rear pressure chamber and when in the actuated condition preventing air flow from said front pressure chamber to said rear pressure chamber but permitting air flow at atmospheric pressure from said rear pressure chamber to said front pressure chamber.

2. A vehicle braking system comprising:

at least one wheel brake;

a master cylinder for generating hydraulic pressure;

a pipe line connecting said master cylinder to said at least one wheel brake;

a pneumatic booster including a main body, a flexible diaphragm disposed in said main body, a power piston secured to said flexible diaphragm and separating an interior of said main body into a vacuum chamber and a pressure chamber, said vacuum chamber having connection means for connecting said vacuum chamber to a source of vacuum, an output shaft connected to said power piston and adapted to actuate said master cylinder, an input rod connected to said power piston and adapted to be actuated by a brake pedal of a vehicle and means for selectively communicating said pressure chamber with said vacuum chamber and air at atmospheric pressure;

a selector valve disposed in said pipe line for intercepting communication between said master cylinder and said at least one wheel brake when said selector valve is actuated;

sensor means for sensing an operating condition of the vehicle and for detecting when a seat bely is fitted to a driver of the vehicle; and a controller connected to said selector valve and said sensor means for actuating said selector valve in response to a predetermined operating condition of the vehicle and for deactuating said selector valve when a seat belt is not fitted to the driver of the vehicle.

3. The vehicle braking system of claim 2, wherein a vehicle speed sensor is connected to said controller, said controller actuating said selector valve when the speed of the vehicle is lower than a predetermined speed and deactuating said selector valve when the speed of the vehicle is above a predetermined speed.

4. The vehicle braking system of claim 2, wherein a steering touch sensor is connected to said controller, said controller deactuating said selector valve when said steering touch sensor does not detect touching of the steering wheel.

5. The vehicle braking system of claim 2, wherein a gas pedal sensor is connected to said controller, said controller actuating said selector valve when a gas pedal of the vehicle is in the non-operating condition and deactuating said selector valve when the gas pedal is in the operating condition.

6. A vehicle braking system comprising:
at least one wheel brake;
a master cylinder for generating hydraulic pressure;
a pipe line connecting said master cylinder to said at least one wheel brake;
a pneumatic booster including a main body, a flexible diaphragm disposed in said main body, a power piston secured to said flexible diaphragm and separating an interior of said main body into a vacuum chamber and a pressure chamber, said vacuum chamber having connection means for connecting said vacuum chamber to a source of vacuum, an output shaft connected to said power piston and adapted to actuate said master cylinder, an input rod connected to said power piston and adapted to be actuated by a brake pedal of a vehicle and means for selectively communicating said pressure chamber with said vacuum chamber and air at atmospheric pressure;
a selector valve disposed in said pipe line for intercepting communication between said master cylinder and said at least one wheel brake when said selector valve is actuated;
sensor means for sensing an operating condition of the vehicle and for detecting when a seat belt is fitted to a driver of the vehicle;
a controller connected to said selector valve and said sensor means for actuating said selector valve in response to a predetermined operating condition of the vehicle and for deactuating said selector valve when a seat belt is not fitted to the driver of the vehicle; and
a warning device connected to said sensing means and said controller for generating a warning signal when the seat belt is not fitted to a driver of the vehicle.

7. The vehicle braking system of claim 6, wherein a vehicle speed sensor is connected to said controller, said controller actuating said selector valve when the speed of the vehicle is lower than a predetermined speed and deactuating said selector valve when the speed of the vehicle is above a predetermined speed.

8. The vehicle braking system of claim 6, wherein a steering touch sensor is connected to said controller, said controller deactuating said selector valve when said steering touch sensor does not detect touching of the steering wheel.

9. The vehicle braking system of claim 6, wherein a gas pedal sensor is connected to said controller, said controller actuating said selector valve when a gas pedal of vehicle is in the non-operating condition and deactuating said selector valve when the gas pedal is in the operating condition.

* * * * *